Oct. 25, 1960 C. N. BREWER ET AL 2,957,244
PRECISION RULING AND SCRIBING DEVICE FOR LINE-UP TABLES
Filed March 20, 1958 3 Sheets-Sheet 2
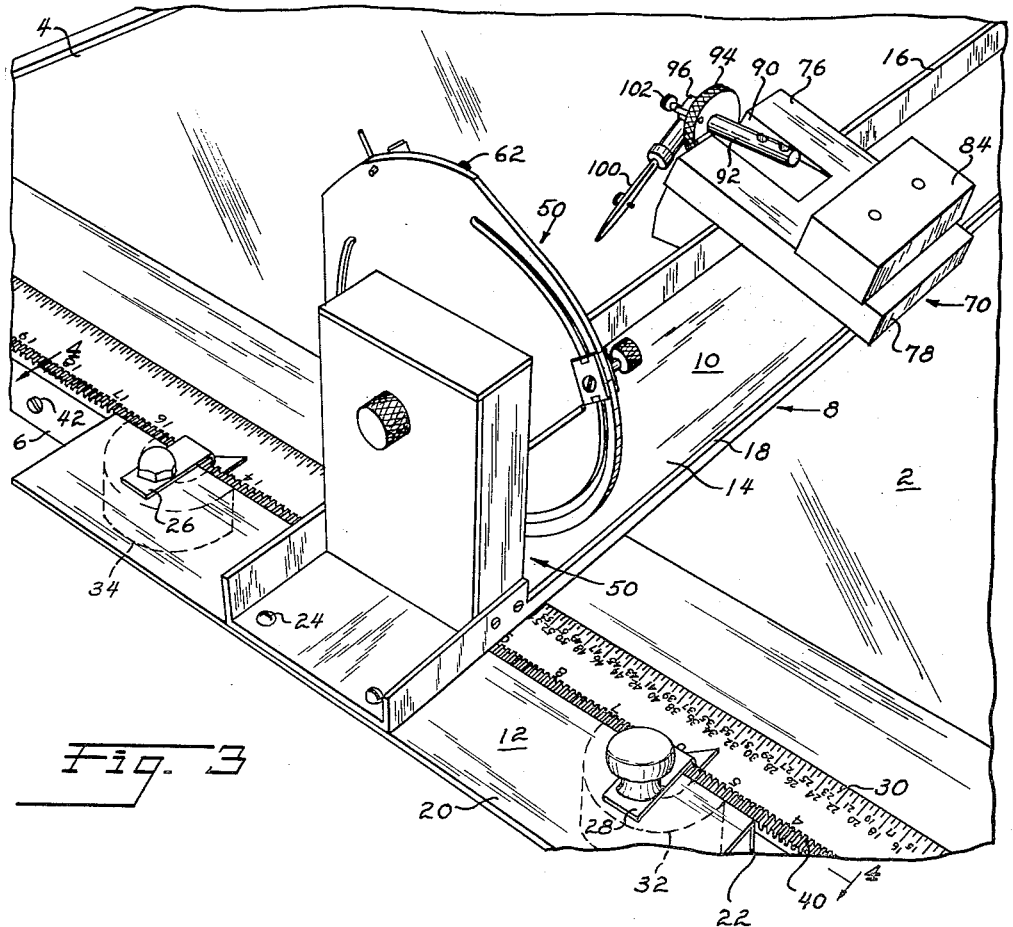
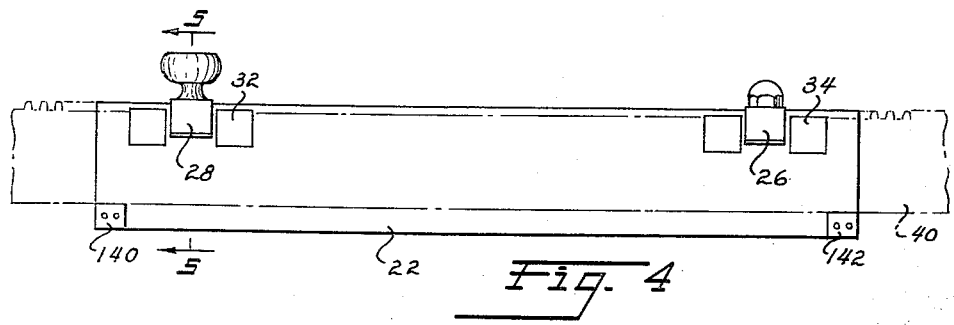
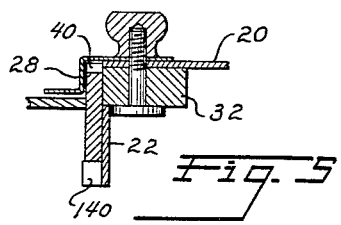
INVENTORS
CLAIRE N. BREWER
CHARLES O. GOSS
HAROLD L. RUDDLE
BY Scrivener & Parker
ATTORNEYS

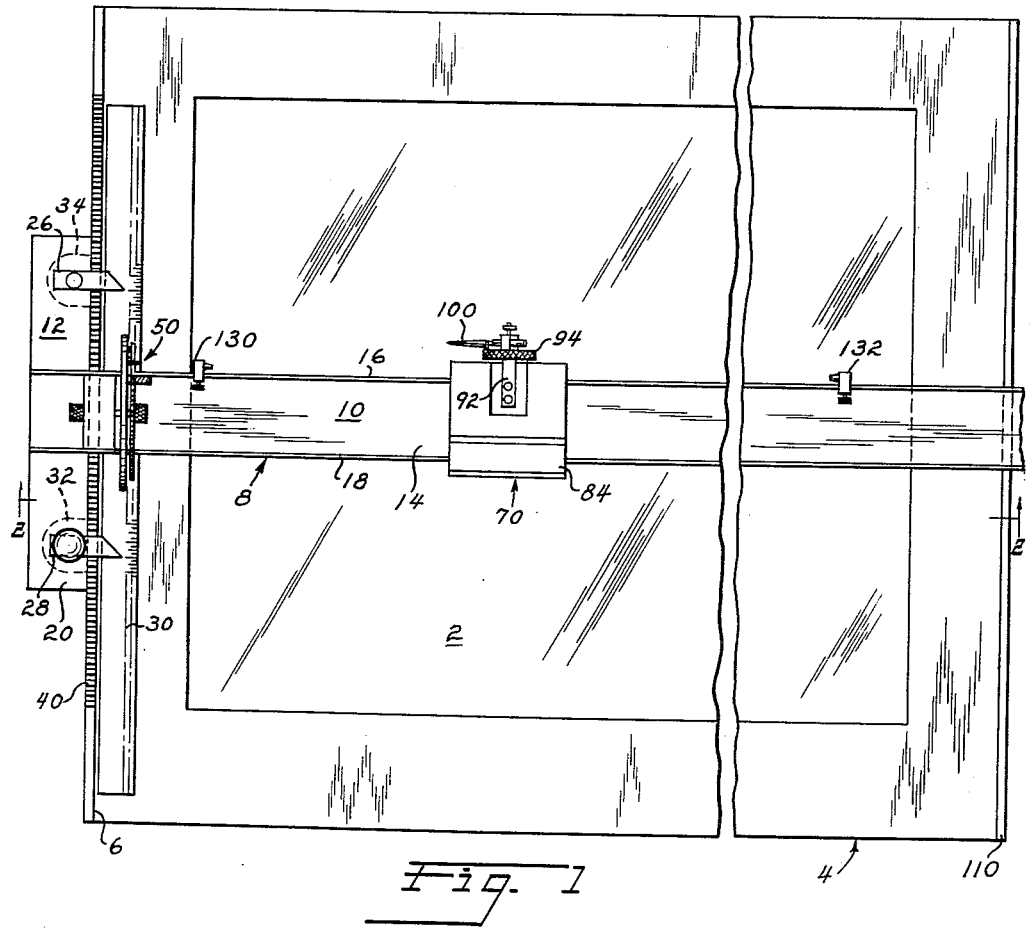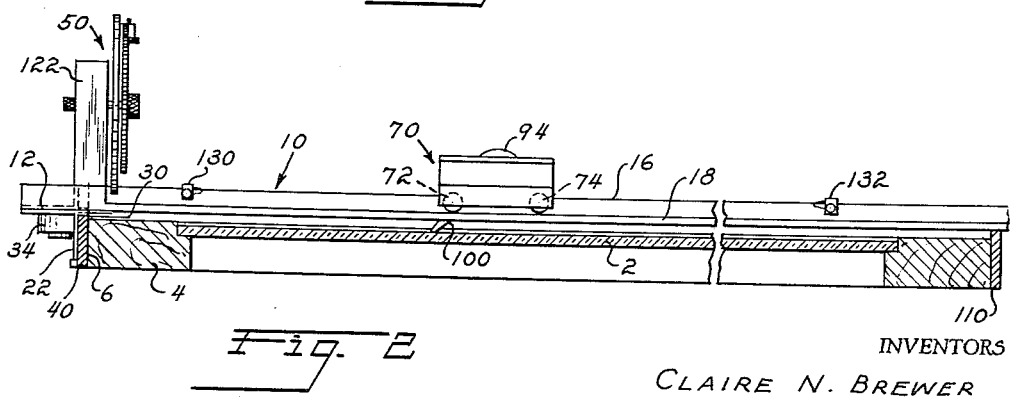

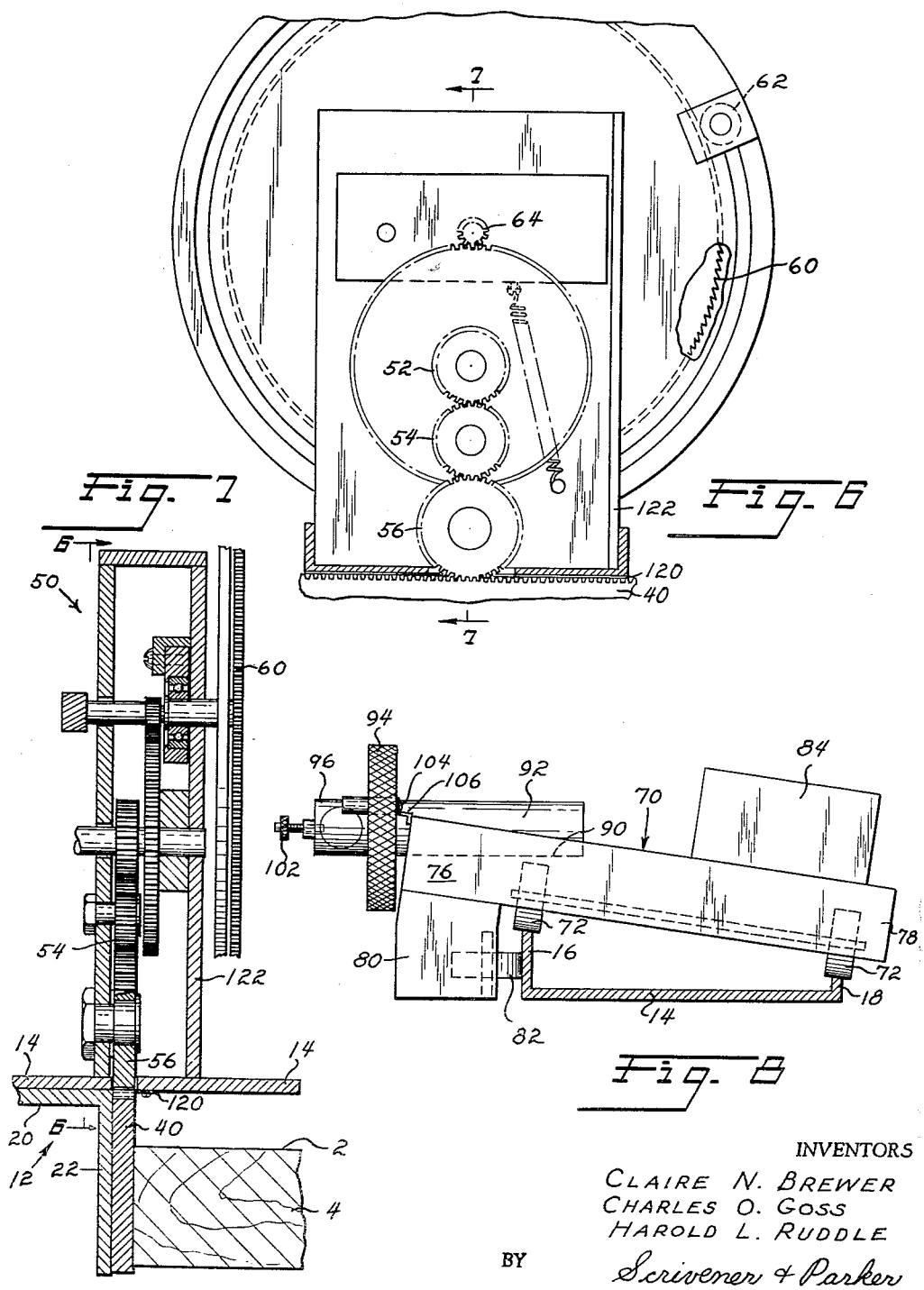

United States Patent Office 2,957,244
Patented Oct. 25, 1960

2,957,244

PRECISION RULING AND SCRIBING DEVICE FOR LINE-UP TABLES

Claire N. Brewer, Charles O. Goss, and Harold L. Ruddle, Indianapolis, Ind., assignors to International Typographical Union of North America, Indianapolis, Ind.

Filed Mar. 20, 1958, Ser. No. 722,690

1 Claim. (Cl. 33—32)

This invention relates broadly to the printing art and, more particularly, relates to so-called "line-up" or "register" tables which are used in performing such make-up operations as lining, ruling, scoring negatives and the like.

In United States Letters Patent Nos. 2,252,535 and 2,421,686 there are disclosed line-up tables of the type to which the invention relates and with respect to which this invention constitutes an improvement. In these tables there is provided a straight-edge which is mounted for movement from end to end of the work surface of the table and which is used in drawing parallel lines extending transversely of the sheet of paper or other material laid on the work surface. Because of the requirements of the printing art the spacing of the lines made with the straight-edge is of extreme importance and must be accurate to very close tolerances which are measured in thousandths of an inch. In line-up tables now known to the art the straight-edge is moved by rotating a shaft through a vernier adjustment causing operation of the means which moves the straight-edge. It has been found that this known means for moving the straight-edge may not be operated to produce the very fine and accurate adjustment of the straight-edge to thousandths of an inch, as is required for such purposes as compensation for expansion or shrinkage of the plates from which the lined paper or the material is printed.

In the co-pending application Serial No. 677,001, filed August 8, 1957, now Patent No. 2,942,351, granted June 28, 1960, for Micrometer Device for Operating the Movable Straight-Edge of a Line-Up Table, there is disclosed and claimed a new and improved means for operating the straight-edge to the accuracy of thousandths of an inch, and for successively moving the straight-edge through exactly the same distance with rapidity and with unvarying and absolute accuracy for any number of times. The present invention has to do with the straight-edge and the lining device which are operated by the means disclosed in my co-pending application and it has been the principal object of this invention to provide a new and improved straight-edge and lining device which may be applied to any line-up table for operation by means such as those disclosed in my co-pending application and which will, to the greatest possible extent, remove the possibility of error due to manual operation.

The invention is described in the following specification and is illustrated in the accompanying drawing in which:

Fig. 1 is a plan view of a line-up table having the straight-edge and its operating means as provided by this invention;

Fig. 2 is a cross section taken on line 2—2 of Fig. 1;

Fig. 3 is an enlarged perspective view of the straight-edge and operating means shown in Fig. 1;

Fig. 4 is a side view of the head of the T-square which forms part of the invention, taken on line 4—4 of Fig. 3;

Fig. 5 is a sectional view taken on line 5—5 of Fig. 4;

Fig. 6 is a partly sectional view showing the operating relations between the micrometer operating device and the movable T-square;

Fig. 7 is a sectional view taken on line 7—7 of Fig. 6; and

Fig. 8 is a partly sectional and partly elevational view showing the pen-carrying carriage.

This invention provides means for drawing one line or a plurality of spaced parallel lines on a sheet of paper, or photographic negative or other material which is laid on the upper horizontal, usually glass surface 2 of a line-up table 4, although it will be understood that while the invention is described in this specification in connection with the lining of a sheet placed on a line-up table it is applicable to and operative with any structure having a flat upper surface on which a sheet may be laid. The line-up table 4 is preferably rectangular in shape having four sides, one of which is shown at 6 and against and along which the ruling device is provided by my invention is adapted to be positioned and slidingly moved. This ruling device comprises essentially a T-shaped structure 8 having an elongated straight-edge part 10 which extends across the upper surface 2 of the line-up table, and a cross-head 12 which is disposed outside of, and parallel to, and in engagement with the side wall 6 of the table.

The straight-edge part 10 of the T-square is channel-shaped in cross-section having the horizontal bottom part 14, front wall 16 and rear wall 18. The front wall 16 provides the straight-edge of the device and is higher, i.e., deeper, than the rear wall 18 for a reason which will be described hereinafter. The cross-head part 12 of the T-square is L-shaped in cross-section having an upper flat horizontal member 20 and a depending flange 22 which is disposed adjacent, outside of and parallel to the side wall 6 of the table. The cross-head part 20 may be formed separately from the straight-edge member 14 if desired, and these two parts are then connected by screws or other suitable means 24. Two pointer devices 26, 28 are connected to the upper surface of the cross-head 20 and extend therefrom in the direction of the table to co-operate with a scale 30 which extends along the table top adjacent the side wall 6. The cross-head 12 is provided with two strong permanent magnets 32, 34 which are disposed preferably adjacent the opposite ends of the cross-head and which extend through the depending wall 22 to be adjacent the side wall 6 of the table.

Means are provided by the invention for moving the straight-edge device along the side wall 6 and such means comprise first an elongated rack 40 which is attached to the side wall 6 of the table by any suitable means such as screw 42 and the upper toothed surface of which is positioned above the upper surface 2 of the table. A mircometer operating device which is indicated generally at 50 is mounted on the upper surface of the T-square above the rack 40. This micrometer operating device is preferably constructed and operative in the same manner as that disclosed in my co-pending application which is referred to above and comprises, in addition, meshing gears 52, 54, 56 which are rotated upon operation of the micrometer device and the lowest of which, being gear 56, meshes with the rack 40. The micrometer device 50 comprises essentially a toothed dial, means for rotating the dial, and means operable upon rotation of the dial to operate gears, all of these parts being disclosed fully in the co-pending application, to which reference is made. The micrometer dial is shown at 60 in the drawings forming part of this specification, the operating handle is shown at 62 and part of the gearing is indicated at 64. The gearing 64 is operatively related to the micrometer dial and to the gear 56 which is in mesh with the rack 40, whereby operation of the micrometer dial through any angle to which it may be pre-set will cause a corresponding rotation of gear 56 with consequent corresponding movement of the T-square along the rack and therefore along the side 6 of the line-up table.

Means are provided by the invention for operative association with the straight-edge part 10 of the T-square for movement along such part to inscribe a line on the film negative, paper sheet or the like which is positioned on the table top 2. Such means comprise a carriage which is indicated generally at 70 and which comprises a generally flat body part which in its operative position extends transversely of the straight-edge part 10 of the T-square and is provided on its lower surface with two pairs of wheels 72, 74 which, when the carriage is operatively positioned on the straight-edge part 10, rest on the upper surfaces of the walls 16, 18 of part 10, whereby the carriage occupies an inclined position on the part 10 of the T-square with its one end 76 higher than its other end 78. The forward end 76 of the carriage overhangs the higher wall 16 and this overhanging part of the carriage is provided on its lower surface with a depending member 80 which has on its inner surface, which is adjacent and parallel and spaced outwardly from the wall 16, a pair of wheels 82 which are mounted in part 80 for rotation about vertical axes. These two wheels 82 are of such a size and are so positioned that when the carriage is in normal operative position on the walls 16, 18 of the straight-edge part 10, they engage the outer surface of the forward, higher wall 16 and therefor form a rolling contact between the carriage and that wall. A block 84, which is of substantial weight, is mounted on the lower, rear part 78 of the carriage and, because of this positioning, constantly exerts as force on the carriage tending to draw the wheels 82 into close rolling contact with the outer surface of wall 16 thereby maintaining a firm and positive engagement between the carriage and the straight-edge part 10. The forward, upper end of the carriage is provided with a groove 90 which extends laterally of the straight-edge part 10 and the bottom surface of which is substantially horizontal. A member 92 is positioned in this groove and is rigidly connected to the carriage. This member has a shaft journaled in it which extends outwardly of the front wall of the carriage and carries a disc 94 to the outer surface of which there is connected a supporting member 96 having an opening therethrough within which a ruling pen or scriber 100 may be positioned. A tightening screw 102 is threaded into member 96 to provide means for adjustment of the ruling pen or scriber with respect to the carriage. A spring pressed detent 104 is carried by the disc 94 and cooperates with a member 106 which is mounted on the front face of the carriage to provide means for releasably holding the ruling pen or scriber in raised or lowered position.

In the preferred form of the invention the rack 40 is so attached to the side wall 6 of the table that the rack teeth are above the upper surface 2 of the table. The lower surface of the bottom 14 of the straight-edge part 14 of the T-square is therefore substantially above the upper surface 2 of the table and a wall or other raised part 110 is provided along the side of the table which is opposite to the rack side in order to support the outer end of the straight-edge part in substantial parallelism to the table top 2. The space thus provided between the straight-edge and the table top permits the easy manipulation and positioning of papers, negatives and the like which are laid on the table top.

A thin, flat, metal plate 120 is attached to the lower surface of the straight-edge part 10 and fills the space between the bottom surface 14 of the straight-edge and the upper surface of the teeth on rack 40, thus providing an improved sliding contact between the T-square parts and the rack teeth. This plate is provided with an opening 124 through which the gear 56 extends into meshing contact with the rack teeth.

Two stops 130, 132 are mounted on the higher, forward wall 16 of the straight-edge part 10 of the T-square and may be moved along the wall and attached in various positions to limit the movement of the carriage 70 along the straight-edge part.

In the preferred construction, the depending wall 22 of the cross-head part 12 of the T-square will extend below the lower edge of rack 40 and two blocks 140, 142 are therefore attached in spaced positions to the outer surface of wall 22 and engage the lower edge of the rack, thereby giving added stability to the T-square and preventing any tipping thereof.

In the use and operation of a ruling device as provided by this invention the rack 40 is first connected to the side edge 6 of the table and the T-square is then positioned with the depending wall 22 of the cross-head 12 outside of and in face-to-face abutting relation with the side wall of the rack. The magnets 32, 34 will exert a force on the metallic rack 40 to firmly hold the cross-head 12 against the rack while still permitting the T-square to be moved along the table with the depending wall 22 in sliding engagement with the outer side wall of the rack. In this condition of the parts the gear 56 of the micrometer device will be in mesh with the teeth on the rack. In order to move the straight-edge along and over the table the handle 62 of the toothed dial 60 of the micrometer device is operated in the manner described in my co-pending application, which results in rotation of gear 56, causing the entire T-square device with its associated parts to move with respect to the rack. The carriage 70 is positioned on the straight-edge part 10 of the T-square with the wheels 72, 74 resting on the walls 16, 18 and the wheels 82 in rolling contact with the outer surface of wall 16. In these positions of the parts the carriage 70 may be moved along the straight-edge part 10 and will always be held in firm and close engagement with this part by reason of the inclined position of the carriage and the provision of the weight 84 at its lower, rear end. The pen 100 may be moved through a large arc about its pivotal connection to the carriage and the detent means 104, 106 will be operative, if desired, to hold the pen in an upper or lower position.

While I have described and illustrated one form which my invention may take it will be apparent to those skilled in the art that other embodiments, as well as modifications of that disclosed, may be made and practiced without departing in any way from the spirit or scope of the invention, for the limits of which reference may be made to the appended claim.

What is claimed is:

In combination with a line-up table, drawing board or the like, a device for drawing a line or a plurality of parallel lines on a sheet positioned on the top of the table, comprising an elongated upwardly facing, metallic rack attached to one side edge of the table with its teeth above the upper surface thereof, a T-square having a cross-head part and a straight-edge part, said straight-edge part comprising an elongated horizontal bottom part and front and rear walls extending along the side edges of the bottom part, the front wall being higher than the rear wall, said cross-head part being in engagement with the outer side wall of said rack, magnetic means carried by the cross-head in operative position with respect to the rack to constantly urge the cross-head into sliding engagement with the rack, a gear carried by the T-square and meshing with the teeth on the rack, means mounted on the T-square and operatively connected to said gear to rotate the gear to cause the T-square to move longitudinally of the rack and with respect to the table, a carriage mounted on the front and rear walls of the straight-edge part of the T-square for movement longitudinally thereof, marking means carried by such carriage, said carriage having a part overhanging the front wall of the straight-edge part, at least one wheel rotatably mounted on said overhanging part and being on rolling contact with the outer surface of said front wall, and a weight mounted on the carriage at its lower end adjacent the rear wall of the straight-edge part and being operative to draw the overhanging part of the carriage and its wheel into firm engagement with the front wall of the straight-edge part.

References Cited in the file of this patent

UNITED STATES PATENTS

| | | |
|---|---|---|
| 1,349,550 | Magnuson | Aug. 10, 1920 |
| 1,642,232 | Edwards | Sept. 13, 1927 |
| 1,853,498 | Bliven | Apr. 12, 1932 |
| 2,058,091 | Marsella et al. | Oct. 20, 1936 |
| 2,269,636 | Mott | Jan. 13, 1942 |
| 2,283,347 | Young | May 19, 1942 |
| 2,675,619 | Cone | Apr. 20, 1954 |
| 2,799,937 | Lewis | July 23, 1957 |

FOREIGN PATENTS

| | | |
|---|---|---|
| 1,103,267 | France | May 18, 1955 |